(12) United States Patent
Hu et al.

(10) Patent No.: US 11,194,186 B2
(45) Date of Patent: Dec. 7, 2021

(54) DISPLAY PANEL AND DISPLAY DEVICE COMPRISING AT LEAST ONE RESTRICTION REGION FORMED BY A CONDUCTIVE WIRING PATTERN THAT RESTRICTS DISPLACEMENT BETWEEN A FIRST SUBSTRATE AND A SECOND SUBSTRATE

(71) Applicant: BOE TECHNOLOGY GROUP CO., LTD., Beijing (CN)

(72) Inventors: Yong Hu, Beijing (CN); Yong Qiao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/734,007

(22) Filed: Jan. 3, 2020

(65) Prior Publication Data

US 2020/0142245 A1 May 7, 2020
US 2021/0116739 A9 Apr. 22, 2021

Related U.S. Application Data

(63) Continuation of application No. 15/526,018, filed as application No. PCT/CN2016/086712 on Jun. 22, 2016, now abandoned.

(30) Foreign Application Priority Data

Mar. 14, 2016 (CN) .......................... 201620190763.1

(51) Int. Cl.
*G02F 1/1333* (2006.01)
*G02F 1/1339* (2006.01)
(Continued)

(52) U.S. Cl.
CPC ...... *G02F 1/133354* (2021.01); *G02F 1/1345* (2013.01); *G02F 1/13394* (2013.01); *G02F 1/133345* (2013.01); *G02F 1/136286* (2013.01)

(58) Field of Classification Search
CPC .......................................... G02F 2001/133354
See application file for complete search history.

(56) References Cited

U.S. PATENT DOCUMENTS

2009/0279040 A1\* 11/2009 Chu .................... G02F 1/13394
349/155
2012/0327347 A1\* 12/2012 Cho ....................... G02F 1/1339
349/138
(Continued)

FOREIGN PATENT DOCUMENTS

CN 102830519 A 12/2012
CN 102937759 A 2/2013
(Continued)

OTHER PUBLICATIONS

English translation of PCT International Search Report, Application No. PCT/CN2016/086712, dated Nov. 21, 2016, 2 pages.
(Continued)

*Primary Examiner* — Paul C Lee
(74) *Attorney, Agent, or Firm* — Armstrong Teasdale LLP

(57) ABSTRACT

The present disclosure provides a display panel and a display device including the display panel, the display panel including a first substrate and a second substrate disposed opposite to each other, wherein at least one restriction region is formed in a peripheral area of the first substrate by a wiring pattern, and one or more spacers are provided on the second substrate corresponding to the restriction region, and the spacers form restriction with the wiring pattern in at least one direction parallel to the substrates.

18 Claims, 3 Drawing Sheets

(51) Int. Cl.
*G02F 1/1345* (2006.01)
*G02F 1/1362* (2006.01)

(56) References Cited

U.S. PATENT DOCUMENTS

| | | | |
|---|---|---|---|
| 2013/0021552 A1 | 1/2013 | Tomioka et al. | |
| 2013/0162939 A1* | 6/2013 | Kobayashi | G02F 1/13394 349/155 |
| 2013/0308084 A1* | 11/2013 | Niwano | G02F 1/1339 349/155 |
| 2016/0187701 A1* | 6/2016 | Zheng | G02F 1/13394 349/106 |

FOREIGN PATENT DOCUMENTS

| | | |
|---|---|---|
| CN | 203084383 U | 7/2013 |
| CN | 104090403 A | 10/2014 |
| JP | 2006084906 A | 3/2006 |

OTHER PUBLICATIONS

PCT Written Opinion, Application No. PCT/CN2016/086712, dated Nov. 21, 2016, 5 pages.: with English translation of relevant part.

U.S. Non-Final Office Action, U.S. Appl. No. 15/526,018, dated Aug. 9, 2018, 15 pages.

U.S. Final Office Action, U.S. Appl. No. 15/526,018, dated Jan. 8, 2019, 11 pages.

U.S. Non-Final Office Action, U.S. Appl. No. 15/526,018, dated Apr. 18, 2019, 12 pages.

U.S. Final Office Action, U.S. Appl. No. 15/526,018, dated Oct. 8, 2019, 13 pages.

* cited by examiner

DISPLAY PANEL AND DISPLAY DEVICE COMPRISING AT LEAST ONE RESTRICTION REGION FORMED BY A CONDUCTIVE WIRING PATTERN THAT RESTRICTS DISPLACEMENT BETWEEN A FIRST SUBSTRATE AND A SECOND SUBSTRATE

CROSS REFERENCE TO RELATED APPLICATIONS

This application is a continuation application of U.S. patent application Ser. No. 15/526,018 filed on May 11, 2017, which is a National Stage Entry of PCT/CN2016/086712 filed on Jun. 22, 2016, which claims the benefit and priority of Chinese Application No. 201620190763.1 filed on Mar. 14, 2016, the disclosures of which are incorporated by reference herein in their entirety as part of the present application.

BACKGROUND

The present disclosure relates to the field of display, and more particularly, to a display panel and a display device.

The liquid crystal display panel is usually composed of upper substrate and lower substrates and a backlight source, in which the upper and lower substrates are generally a color film substrate and an array substrate. In the case where the alignment is good, the light from the backlight source passes through a filter layer for display of the color film substrate, thereby displaying a screen.

The array substrate and the color film substrate of the liquid crystal display panel tend to be displaced in the X direction (i.e., the direction parallel to the array substrate and/or the color film substrate) so that the primary color portions in the color film substrate and the portion of the array substrate for display have displacement deviation, so that when the backlight is irradiated to the array substrate, the liquid crystal display panel is prone to light leakage, color mixing and other undesirable phenomena. This occurs mainly in the following two scenarios:

1) In the manufacture process of the liquid crystal panel, when the sealing rubber between the array substrate and the color film substrate is not cured, and during the processing and transportation process of the liquid crystal panel; and 2) After completion of the manufacture of the liquid crystal panel, extrusion and bending (such as touching) from the Y direction results in local deformation of the glass substrate, and after the deformation is restored it is possible to form a misalignment between the array substrate and the color film substrate.

It can be seen that there is a need in the art for a solution that overcomes the displacement between upper and lower substrates of the display panel.

BRIEF DESCRIPTION

An embodiment of the present disclosure provides a display panel, including a first substrate and a second substrate disposed opposite to each other, wherein at least one restriction region is formed by a wiring pattern in a peripheral area of the first substrate, and one or more spacers are provided on the second substrate corresponding to the restriction region, the spacers forming restriction with the wiring pattern in at least one direction parallel to the substrates.

According to an exemplary embodiment of the present disclosure, the forming restriction in at least one direction parallel to the substrates includes forming restriction in at least two directions.

According to an exemplary embodiment of the present disclosure, the wiring pattern includes a wiring and/or a mark line pattern, the wiring including at least one of a gate line lead wire, a data line lead wire, a common electrode lead wire, an electrostatic protection ring, and a repair line.

According to an exemplary embodiment of the present disclosure, the at least one restriction region includes a gap between at least two parallel and/or intersecting wires.

According to an exemplary embodiment of the present disclosure, the at least one restriction region is formed by a bend portion of a single wire.

According to an exemplary embodiment of the present disclosure, the spacers are provided at least two different restriction regions, the spacers and the different restriction regions performing restriction in at least two different directions parallel to the substrates.

According to an exemplary embodiment of the present disclosure, the angle between the two different directions is 90° or 180°.

According to an exemplary embodiment of the present disclosure, at least one spacer is provided on the second substrate at a position corresponding to the wiring in the peripheral area of the first substrate.

According to an exemplary embodiment of the present disclosure, at least a portion of the spacers are different in shape or size depending on different restriction regions.

Another embodiment of the present disclosure provides a display device including a display panel according to any one of the above embodiments.

The technical solution of the present disclosure can effectively prevent the occurrence of misalignment between the upper and lower substrates of a display panel, thereby avoiding the occurrence of light leakage, color mixing and other undesirable phenomena. Further, by using a restriction region formed by wiring in the peripheral area of the first substrate and spacers provided on the second substrate to form a restriction structure, the solution of the present disclosure is simple in structure and inexpensive.

DETAILED DESCRIPTION

The display panels provided in embodiments of the present disclosure will now be described in further detail with reference to the accompanying drawings and specific embodiments in order to provide a better understanding of the technical solutions of the present disclosure by those skilled in the art. It is obvious that the described embodiments are part of the present application, not all embodiments. All other embodiments obtained by one of ordinary skill in the art based on the described embodiments of the present disclosure without paying creative effort are within the scope of this disclosure.

Figure 1:
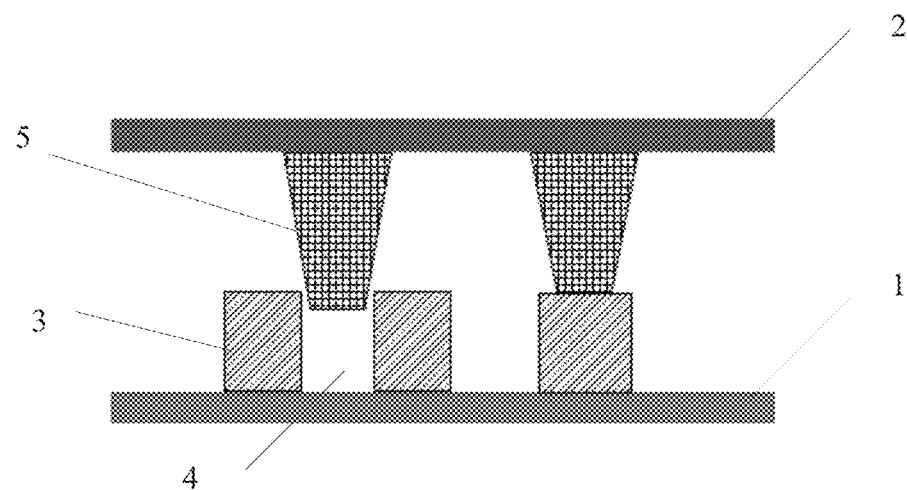
FIG. 1 shows a cross-sectional view of a display panel according to an embodiment of the present disclosure.
Figure 2:
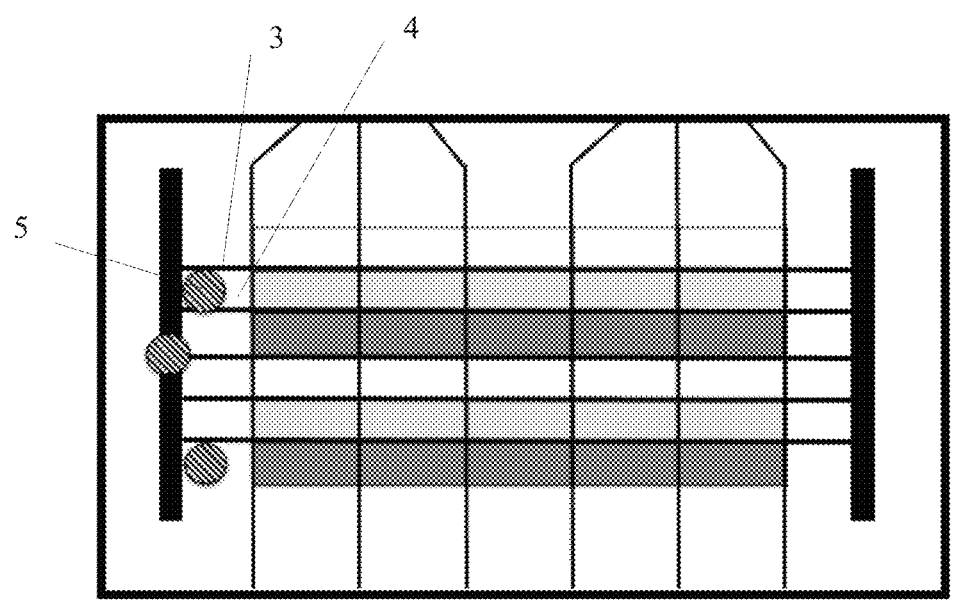
FIG. 2 shows a plan view of a display panel according to an embodiment of the present disclosure.

Embodiments of the present disclosure will now be described with reference to the accompanying drawings. FIG. 1 shows a cross-sectional view of a display panel according to an embodiment of the present disclosure. FIG. 2 shows a plan view of a display panel according to an embodiment of the present disclosure.

As shown in the drawing, according to an embodiment of the present disclosure, the display panel may include a first substrate 1 and a second substrate 2 disposed opposite to each other, and at least one restriction region 4 may be formed in a peripheral area of the first substrate 1 by a wiring pattern 3. Spacers 5 may be provided on the second substrate 2 corresponding to the restriction regions, and the spacers 5 form restriction with the wiring pattern in at least one direction parallel to the substrates. The first substrate 1 may include a pixel region and the peripheral area other than the pixel region.

According to an exemplary embodiment of the present disclosure, the first substrate 1 may be an array substrate, and the second substrate 2 may be a color film substrate.

According to an exemplary embodiment of the present disclosure, the forming restriction in at least one direction parallel to the substrates may include forming restriction in at least two directions.

According to a further exemplary embodiment of the present disclosure, the wiring pattern includes a wiring and/or a mark line pattern, the wiring including at least one of a gate line lead wire, a data line lead wire, a common electrode lead wire, an electrostatic protection ring, and a repair line. The marking line is, for example, a marking or alignment marking line in a manufacturing process.

According to an exemplary embodiment of the present disclosure, the at least one restriction region 4 may be constituted by a gap between at least two parallel and/or intersecting wires 3.

For example, the at least one restriction region 4 may be formed by two parallel adjacent wires 3 and a wire 3 perpendicular to the adjacent wires 3 so as to form restriction in both directions toward the adjacent wires 3.

Figure 3:
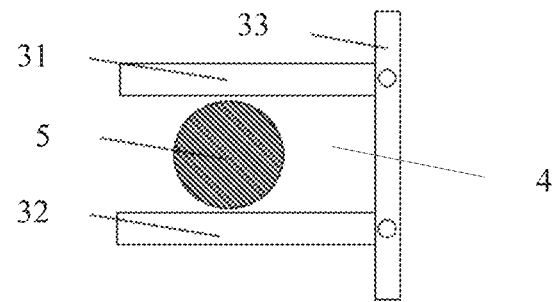
FIG. 3 schematically shows a restriction structure according to an exemplary embodiment of the present disclosure.

FIG. 3 schematically shows a restriction structure in this embodiment. As shown in FIG. 3, the adjacent wire 31 and the wire 32 in the peripheral area of the array substrate 1 are connected to the wire 33 through the via holes, respectively, and the space between the wire 31 and the wire 32 forms the restriction region 4. A spacer 5 is provided on the color film substrate 2 disposed opposite to the array substrate 1, and the spacer 5 corresponds to the position of the restriction region 4 on the array substrate 1 forming a restriction structure when the color film substrate 2 is aligned with the array substrate 1. When the color film substrate 2 and the array substrate 1 are subjected to a lateral displacement tendency due to an external force, the restriction structure may restrict the displacement in both directions, i.e., the direction from the spacer 5 toward the wire 31, and the direction from the spacer 5 toward the wire 32.

As a further example, at least two restriction regions 4 are formed by two parallel adjacent wires 3 and a wire 3 perpendicular to the adjacent wires 3 so as to form restriction in four directions toward the adjacent wires 3 and toward the perpendicular wire 3.

Figure 4:
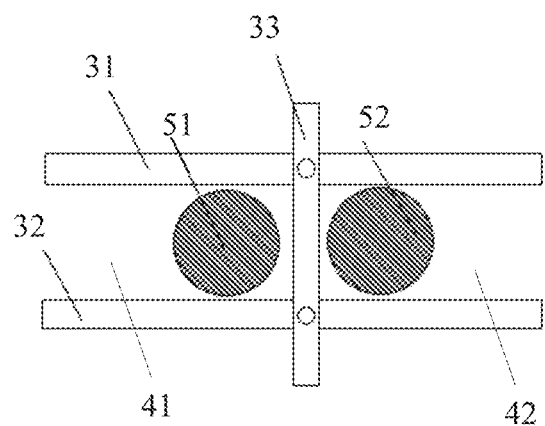
FIG. 4 schematically shows a restriction structure according to another exemplary embodiment of the present disclosure.

FIG. 4 schematically shows the restriction structure in this embodiment. As shown in FIG. 4, the spacer group of the spacers 51 and 52 and the restriction regions 41 and 42 formed by the wires 31, 32 and 33 constitute a restriction structure, producing restriction for the displacement of the two substrates in the two directions.

According to another exemplary embodiment of the present disclosure, the at least one restriction region is formed by a bent portion of a single wire 3.

Figure 5:
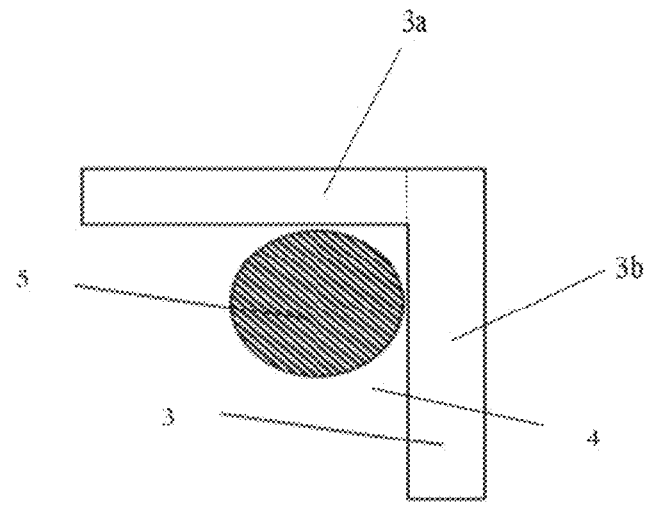
FIG. 5 schematically shows a restriction structure according to yet another exemplary embodiment of the present disclosure.

FIG. 5 schematically shows the restriction structure in this embodiment. As shown in FIG. 5, the restriction region 4 is formed by bending a single wire 3 itself on the array substrate 1, and the spacer 5 on the color film substrate 2 is provided in the restriction region 4 formed by the bending, producing restriction for the displacement in the two directions toward the bent portions. Referring to FIGS. 1 and 5, the bent portion of the single wire 3 includes a first portion 3a and a second portion 3b bent with respect to the first portion 3a along a direction parallel to the first substrate 1. Further, the first portion 3a and the second portion 3b are located on a same plane parallel to the first substrate 1.

According to an exemplary embodiment of the present disclosure, the wire 3 includes at least one peripheral wire of a display panel.

According to an exemplary embodiment of the present disclosure, the spacers 5 are provided in at least two different restriction regions 4, the spacers and the different restriction regions performing restriction in at least two different directions parallel to the substrates.

According to a further exemplary embodiment of the present disclosure, the angle between the two different directions is 90° or 180°.

According to an exemplary embodiment of the present disclosure, at least one spacer 5 is provided on the second substrate at a position corresponding to the wire 3 in the peripheral area of the first substrate. In this way, the at least one spacer 5 may serve as a support.

Figure 6:
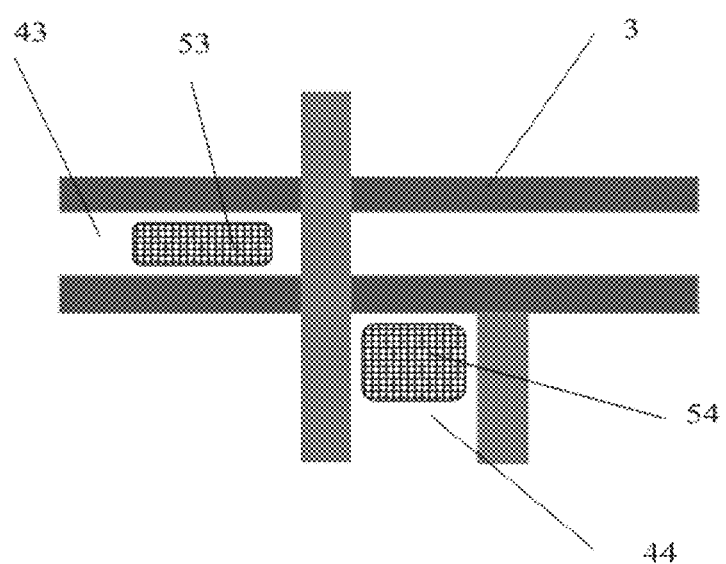
FIG. 6 schematically shows an example in which different spacers corresponding to different restriction regions have different shapes.

According to an exemplary embodiment of the present disclosure, at least a portion of the spacers in the spacer 5 differ in shape or size depending on different restriction regions. In this way, different spacers can be adapted to restriction areas of different shapes, so as to better play the required restriction role. FIG. 6 schematically shows an example in which different spacers correspond to different shapes of different restriction regions. As shown, in the two restriction regions 43, 44 constituted by a plurality of wires 3, the two spacers 53, 54 have different shapes and sizes so that the spacers 53, 54 are better adapted to its corresponding restriction areas, so as to better play the required restriction role.

In the above embodiments, the wire 3 may be an existing peripheral wire in the array substrate 1, and the spacers 5 may be existing spacers having a supporting function in the color film substrate 2, and in this case, it is necessary to adjust the positions of at least a portion of the existing spacers so as to be located in the restriction region 4. The spacers 5 may also be spacers provided apart from the existing spacers and dedicated to play the restriction role. The spacers 5 may be one or more, and the restriction regions 4 may also be one or more. In addition, different spacers 5 in different restriction regions 4 may restrict in different directions.

Another aspect of the present disclosure provides a display device including a display panel according to any one of the preceding embodiments.

It is to be understood that the above embodiments are merely illustrative embodiments for the purpose of illustrating the principles of the present disclosure and that the present disclosure is not limited thereto. It will be apparent to those skilled in the art that various changes and modifications can be made therein without departing from the spirit and spirit of the present disclosure, which are also intended to be within the scope of the present disclosure. The scope of protection of the present disclosure is limited only by the language representation of the appended claims and equivalents thereof

What is claimed is:

1. A display panel comprising:
a first substrate and a second substrate disposed opposite to each other, wherein at least one restriction region is formed in a peripheral area of the first substrate by a wiring pattern, and wherein one or more spacers are provided on the second substrate corresponding to the at least one restriction region and spaced apart from the first substrate, the one or more spacers and the wiring pattern restricting displacement between the first substrate and the second substrate in at least one direction parallel to the first and second substrates,
wherein the at least one restriction region is formed by a bent portion of a single wire, the single wire completely located on a plane parallel to the first substrate, the bent portion comprising a first portion and a second portion bent at an angle of 90° with respect to the first portion within a plane parallel to the first substrate in a plan view,
wherein a surface of the spacer facing the first substrate is farther away from the first substrate than a surface of the wiring pattern facing the first substrate, and
wherein the wiring pattern is conductive.

2. The display panel according to claim 1, wherein restricting displacement in at least one direction parallel to the first and second substrates comprises restricting displacement in at least two directions.

3. The display panel according to claim 1, wherein the wiring pattern includes at least one of a wiring and a mark line pattern, the wiring including at least one of a gate line lead wire, a data line lead wire, a common electrode lead wire, an electrostatic protection ring, and a repair line.

4. The display panel according to claim 3, wherein the one or more spacers are provided at least in two different restriction regions, the one or more spacers and the different restriction regions restricting displacement in at least two different directions parallel to the first and second substrates.

5. The display panel according to claim 4, wherein an angle between the two different directions is one of 90° and 180°.

6. The display panel according to claim 3, wherein at least one spacer is provided on the second substrate at a position corresponding to the wiring in the peripheral area of the first substrate.

7. The display panel according to claim 1, wherein at least a portion of the one or more spacers differ in at least one of shape and size depending on different restriction regions.

8. A display device comprising a display panel according to claim 1.

9. The display panel according to claim 2, wherein the wiring pattern includes at least one of a wiring and a mark line pattern, the wiring including at least one of a gate line lead wire, a data line lead wire, a common electrode lead wire, an electrostatic protection ring, and a repair line.

10. A display device comprising a display panel according to claim 2.

11. A display device comprising a display panel according to claim 3.

12. A display device comprising a display panel according to claim 4.

13. A display device comprising a display panel according to claim 5.

14. A display device comprising a display panel according to claim 6.

15. A display device comprising a display panel according to claim 7.

16. A display panel comprising:
a first substrate and a second substrate disposed opposite to each other, wherein at least one restriction region is formed in a peripheral area of the first substrate by a wiring pattern, and wherein one or more spacers are provided on the second substrate corresponding to the at least one restriction region and spaced apart from the first substrate, the one or more spacers and the wiring pattern restricting displacement between the first substrate and the second substrate in at least one direction parallel to the first and second substrates,
wherein the wiring pattern comprises two parallel adjacent wires and a wire perpendicular to the two parallel adjacent wires,
wherein a surface of the spacer facing the first substrate is farther away from the first substrate than a surface of the wiring pattern facing the first substrate, and
wherein the wiring pattern is conductive.

17. The display panel according to claim 16, wherein the wiring pattern further comprises another wire, and
wherein the another wire is parallel to the wire and intersects one of the two parallel adjacent wires.

18. The display panel according to claim 16, wherein the wiring pattern includes at least one of a wiring and a mark line pattern, the wiring including at least one of a gate line lead wire, a data line lead wire, a common electrode lead wire, an electrostatic protection ring, and a repair line.

* * * * *